(No Model.)
O. C. HALL.
CHUCK.
No. 376,650. Patented Jan. 17, 1888.
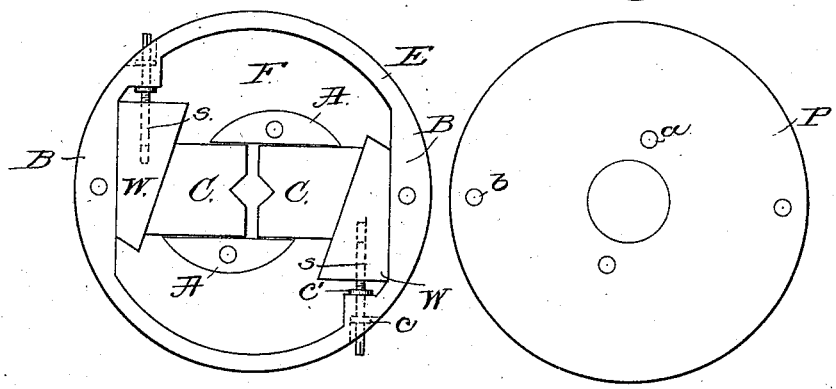
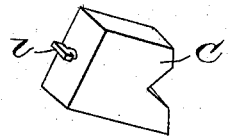
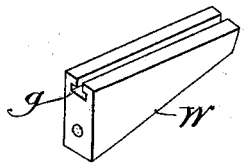
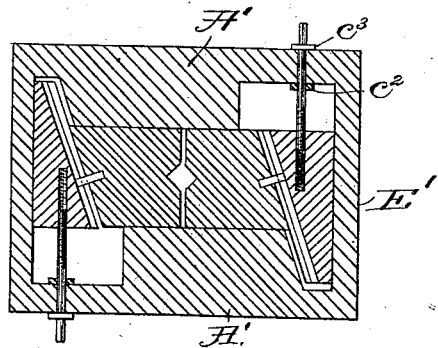
Witnesses.
Howard F. Eaton.
Fred L. Emery.
Inventor:
O. Clifford Hall.
by Crosby & Gregory
Attys.

UNITED STATES PATENT OFFICE.

O. CLIFFORD HALL, OF WILKES-BARRÉ, PENNSYLVANIA, ASSIGNOR TO THE SHELDON AXLE COMPANY, OF SAME PLACE.

CHUCK.

SPECIFICATION forming part of Letters Patent No. 376,650, dated January 17, 1888.

Application filed September 13, 1887. Serial No. 249,559. (No model.)

*To all whom it may concern:*

Be it known that I, O. CLIFFORD HALL, of Wilkes-Barré, county of Luzerne, and State of Pennsylvania, have invented an Improvement in Chucks, of which the following description, in connection with the accompanying drawings, is a specification, like letters on the drawings representing like parts.

This invention has for its object the production of an improved chuck for lathes, drills, or any machines in which it is necessary to firmly and readily grasp either the tool or the article to be operated upon.

My invention consists, essentially, of a chuck having jaws and independent wedge-shaped blocks and screws to move the said blocks and adjust the jaws, as will be described.

Figure 1 is a front view of my improved chuck with the cover-plate removed. Fig. 2 is a top view of the cover-plate. Fig. 3 is a perspective view of one jaw of the chuck; Fig. 4, a like view of one of the wedge-shaped blocks; and Fig. 5 is a sectional view of a modified form of chuck containing my invention.

The chuck is and may be of any suitable metal and shape, that depending upon the machine to which it is to be applied.

The back F of the chuck is flanged, as at E, (see Fig. 1,) the flange being provided with segmental enlargements B B, which form suitable bearings for one edge of each of the wedge-shaped blocks W, each block being actuated independently by a screw, as $s$, held loosely in the flange of the chuck by suitable collars, $c$ $c'$, which prevent longitudinal movement of the said screws. The inclined faces of the blocks W are grooved, as at $g$, Fig. 4, to receive a T-shaped projection or lug, $l$, at the outer end of each jaw C, (see Fig. 3,) the angularity of the grooved face of the wedge-shaped blocks and of the outer ends of the jaws being the same, thus permitting the said blocks to slide past the jaws C and force them toward or away from each other when the screws $s$ are turned to the right or left.

The back F of the chuck is provided with bearings A A for the jaws C, the said bearings being preferably of such a height as to form supports for the cover-plate P, which is attached to them and to the flange E by screws (not shown) extended into holes, as at $a$ and $b$.

The plate P has a central hole (see Fig. 2) of such size as not to interfere with the tool or article which may be held by the chuck when its jaws are open to their widest extent. As each jaw is moved by an independent wedge-shaped block, one may be moved without altering the position of the other, or one jaw may be moved to a greater extent than the other. The T-shaped projections sliding in the grooves $g$ serve to withdraw the jaws from the center of the chuck.

In the modification shown in section, Fig. 4, the flange E' and its enlarged portions A' A' furnish the bearings, respectively, for the wedge-shaped blocks and the jaws, the chuck being rectangular in form.

I claim—

1. The combination, with the jaws of the chuck and independently-movable wedge-shaped blocks, of screws to move the said blocks to adjust the said jaws, substantially as described.

2. The chuck-jaws C, provided each with a projection at its outer end and wedge-shaped blocks grooved to receive the said projections, combined with actuating-screws to move the said blocks independently of each other, substantially as described.

In testimony whereof I have signed my name to this specification in the presence of two subscribing witnesses.

O. CLIFFORD HALL.

Witnesses:
C. H. GILLAM,
JNO. McCREERY.